N. RAPPLEYEA & W. A. SPARKS.
COFFIN.
No. 10,774. Reissued Oct. 26, 1886.
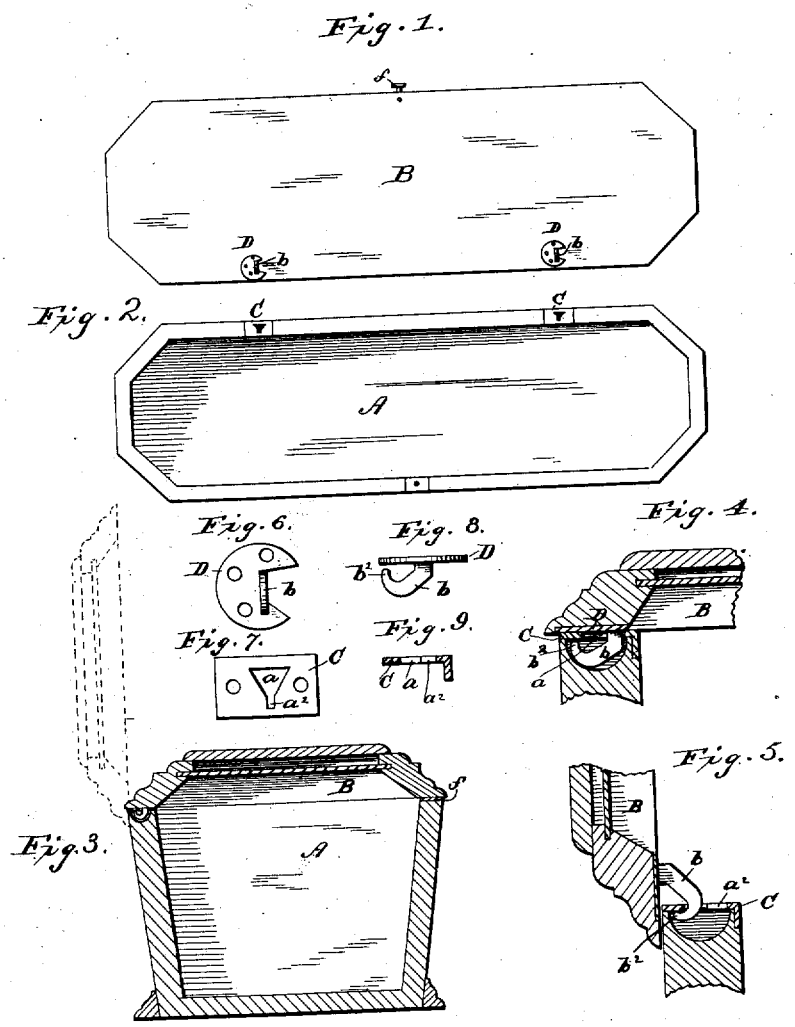
Witnesses.
Chas. R. Burr.
A. J. Stuart.
Inventors.
Nicholas Rappleyea & William A. Sparks.
by Clemch & Clemch
their Attorneys.
N. PETERS, Photo-Lithographer, Washington, D. C.

UNITED STATES PATENT OFFICE.

NICHOLAS RAPPLEYEA AND WILLIAM A. SPARKS, OF ROCHESTER, N. Y.

COFFIN.

SPECIFICATION forming part of Reissued Letters Patent No. 10,774, dated October 26, 1886.

Original No. 347,739, dated August 17, 1886. Application for reissue filed September 22, 1886. Serial No. 214,292.

*To all whom it may concern:*

Be it known that we, NICHOLAS RAPPLEYEA and WILLIAM A. SPARKS, both of Rochester, Monroe county, New York, have invented a certain new and useful Improvement in Burial-Caskets; and we do hereby declare the following to be a full, clear, and exact description of the same, reference being had to the accompanying drawings, in which—

Figure 1 is a bottom view of the casket-lid. Fig. 2 is a top view of the casket. Fig. 3 is a cross-section of the casket enlarged, showing the lid closed on the casket-body. Fig. 4 is a similar view enlarged over Fig. 3. Fig. 5 is a similar view with the lid opened. Figs. 6 and 7 are plan views of the interlocking plates. Figs. 8 and 9 are a side view and section, respectively, of same parts.

This improvement relates to burial-caskets in which the lid is made to turn up, as on a hinge. It is applicable more particularly to small caskets, but may also be used on large ones.

The invention consists in the peculiar construction and arrangement of the interlocking plates that form the hinge, as hereinafter more fully described.

In the drawings, A shows the casket, and B the lid. Figs. 1 and 2 show the parts separated.

Our improvement is as follows: C C are plates which are attached on the top edge of the casket on one side only, and D D are corresponding plates attached on the under side of the lid. The plates C have slots *a*, which stand crosswise of the plate and of the edge of the casket, as shown in the enlarged plan view, Fig. 7. The outer end of the slot is made wide and of the triangular form shown at *a*, while the inner end of the slot, next to the interior of the casket, is made narrow and of just such width as to receive the thickness of the tongue of the plates D, as shown at $a^2$, the object of which will be presently described. The plates D have tongues *b*, which stand downward and forward in the inclined position shown in Fig. 8, and at the outer end is an upturned hook, $b^2$, of the shape substantially as indicated.

The operation is as follows: The tongues *b* are inserted in the slots *a*, the hook $b^2$ fitting under the outer edge of the slot, and in that condition the lid can be turned up and down, as on a hinge, as indicated by the full and dotted lines in Fig. 3. The broad portion *a* of the slot allows easy entrance of the tongue, even if it is not exactly centered, so that a single person can apply and remove the lid without difficulty. If a narrow slot were used, it would be difficult to insert all the tongues at once. At the same time, when the lid is closed down the inclined sides of the wide part of the slot guide the back of the tongue to a central position, and when the lid is fully closed the back of the tongue fits into the narrow part $a^2$ of the slot, which centers the lid so that the catch *f* on the opposite side of the casket will engage with its socket, and also that the lid is firmly seated in place and has no loose movement. The hook $b^2$ at the outer end of the tongue holds under the plate at the outer end of the slot and prevents the disengagement of the lid from the casket when the lid is turned up, as shown in Fig. 5. In some cases the hook at the end of the tongue may be dispensed with, especially in large caskets, in which case the tongue is simply made inclined and straight; but the same form of the slot is used to center and hold the tongue.

This same invention may be applied to boxes and receptacles when a lid is to be attached in a similar manner.

Having described our invention, we do not claim a grooved plate on the casket and a hook on the lid for guiding the lid in an endwise direction. Neither do we claim a slotted plate and curved tongue, such as are used to attach covers to sewing-machines.

What we claim as new, and desire to secure by Letters Patent, is—

1. In a burial-casket, the combination of plates C, provided with slots wide at their outer ends and narrow at their inner ends located crosswise of the casket, and plates D, provided with tongues having upturned hooks at their outer ends located crosswise of the lid, said tongues entering the wide part of the slots and centering to the narrow part to bring the locking-catch in line with its socket when the lid is closed, and serving as hangers to hold the lid from disengagement when the lid is opened, as herein shown and described.

2. In a burial-casket, the combination of plates provided with slots located crosswise of the casket, and other plates provided with tongues having upturned hooks at their outer ends located crosswise of the lid, said tongues entering said slots and serving as hangers to hold the lid from disengagement when the lid is opened, substantially as described.

NICHOLAS RAPPLEYEA.
WILLIAM A. SPARKS.

Witnesses:
S. L. DOBBIN,
GEO. P. HESS.